US005455469A

United States Patent [19]
Ward

[11] Patent Number: 5,455,469
[45] Date of Patent: Oct. 3, 1995

[54] COMPARATOR CONTROLLED DELAY-ON-BREAK DEVICES

[75] Inventor: C. Barry Ward, Sunrise, Fla.

[73] Assignee: Watsco Components, Inc., Hialeah, Fla.

[21] Appl. No.: 134,380

[22] Filed: Oct. 12, 1993

[51] Int. Cl.⁶ .................................................. H02H 7/00
[52] U.S. Cl. ........................... 307/141.4; 62/158; 361/22; 361/28
[58] Field of Search ................ 307/141, 141.4, 307/140; 361/22, 23, 28, 29, 375; 62/158; 318/445, 452, 484

[56] References Cited

U.S. PATENT DOCUMENTS

| | | | |
|---|---|---|---|
| 3,127,754 | 4/1964 | Mobarry | 62/158 |
| 3,369,154 | 2/1968 | Swain | 317/22 |
| 3,457,464 | 6/1969 | Wallentowitz | 317/142 |
| 3,526,809 | 9/1970 | Obenhaus | 317/13 |
| 3,553,495 | 1/1971 | Shaugnessy | 307/284 |
| 3,619,668 | 11/1971 | Pinckaers | 307/293 |
| 3,636,369 | 1/1972 | Harter | 307/141.4 |
| 3,660,718 | 5/1972 | Pinckaers | 317/138 |
| 3,681,613 | 8/1972 | Frieder et al. | 307/141.4 |
| 3,721,880 | 3/1973 | Neill | 318/471 |
| 3,742,302 | 6/1973 | Neill | 317/13 R |
| 3,742,303 | 6/1973 | Dageford | 317/13 A |
| 3,755,695 | 8/1973 | Krick et al. | 307/293 |
| 3,796,061 | 3/1974 | Weihl | 62/158 |
| 3,814,991 | 6/1974 | Hewitt | 317/141 |
| 3,864,611 | 2/1975 | Chang | 318/484 |
| 3,883,782 | 5/1975 | Beckwith | 317/16 |
| 3,946,574 | 3/1976 | Portera | 62/158 |
| 4,079,267 | 3/1978 | Ryczek et al. | 307/141 |
| 4,128,854 | 12/1978 | Ruminsky | 361/22 |
| 4,281,358 | 7/1981 | Plouffe et al. | 361/22 |
| 4,338,562 | 7/1982 | Terwilliger | 323/323 |
| 4,382,192 | 5/1983 | Mendelson | 307/141.4 |
| 4,584,623 | 4/1986 | Bello et al. | 361/90 |
| 4,602,484 | 7/1986 | Bendikson | 62/158 |
| 4,642,479 | 2/1987 | Lombardi et al. | 307/141 |
| 4,825,328 | 4/1989 | Izaguirre, Sr. | 361/90 |
| 4,878,760 | 11/1989 | Newton et al. | 366/149 |
| 4,990,887 | 2/1991 | Lee | 340/479 |
| 4,991,049 | 2/1991 | Kadah | 361/28 |
| 5,021,917 | 6/1991 | Pike et al. | 361/195 |
| 5,207,080 | 5/1993 | Reinhard | 68/12.18 |

OTHER PUBLICATIONS

Circuit Schematic of Watsco Components Corp. Prior Art EAC–511 Series Timer.
SSAC Precision Products TA Series Timer Schematic of Aug. 23, 1977.
SSAC Precision Products TA Series Timer Schematic of Aug. 20. 1976.
[000c] 158, LM258, LM358, LM2904 Representative Circuit Schematic.
SSAC Precision Products TA Timer Schematic dated Jan. 23, 1981.

Primary Examiner—William M. Shoop, Jr.
Assistant Examiner—Jonathan S. Kaplan
Attorney, Agent, or Firm—Holland & Knight

[57] ABSTRACT

A delay-on-break circuit adaptable for A.C. or D.C. applications utilizes a timer and a pair of comparators to prevent a load from being re-energized until at least a predetermined period of time has elapsed since the most recent deenergization of the load. A feedback element, such as a zener diode, connected between the output of one of the comparators and a feedback input thereof provides reliable latching of the load through zero crossings of the line in A.C. applications without use of a latching capacitor while simultaneously providing brownout protection capable of rapidly deenergizing the load in the event of an undesired decrease in line voltage.

9 Claims, 3 Drawing Sheets

COMPARATOR CONTROLLED DELAY-ON-BREAK DEVICES

FIELD OF THE INVENTION

The invention relates to devices for preventing an electrical load from being energized until at least a predetermined period of time has elapsed since its most recent deenergization. More particularly, the present invention relates to such devices wherein a pair of comparators are used for selectively enabling energization of the load by controlling a switching device such as a triac. Latching of the triac to permit energization of the load to be maintained through zero crossings of the line as well as brownout protection are afforded by providing one of the comparators feedback through an element such as a zener diode.

BACKGROUND OF THE DISCLOSURE

Devices of the class to which the present invention relates are commonly called "off-delay" or "delay-on-break" relays or timers. They are so called because they provide a time delay function which commences upon de-energizing or "breaking" an electrical or electronic circuit. A typical delay-on-break relay includes a switching device such as silicon controlled rectifier, triac or electromechanical relay which can be connected in series with a load. The switching device is controlled by a timer to prevent the load from being reenergized until at least a predetermined period of time elapses after the most recent prior energization of the load. Various circuits for implementing a delay-on-break function are shown for example in U.S. Pat. Nos. 3,814,991 to Hewitt; 3,619,668 to Pinckaers; 3,636,369 to Harter; 3,742,303 to Dageford; 3,864,611 to Chang; 4,281,358 to Plouffe; 3,946,574 to Portera and 4,991,049 to Kadah.

Delay-on-break devices are used in a wide variety of control applications as well as to protect certain types of loads from damage which might otherwise be caused by cycling them off and on too rapidly. One common application of delay-on-break devices is the protection of compressor drive motors in air conditioning and refrigeration equipment. Such motors are often capable of delivering only modest starting torque even though they are capable of driving much greater loads at typical operating speeds. If an air conditioning or refrigeration system has been off for a sufficient length of time, the pressure across the compressor, and the corresponding starting load on the motor, are low enough to permit the motor to start and drive the compressor even with the modest starting torque available. As the motor picks up speed, the compressor raises the pressure in the system and the load on the motor increases substantially. When the motor is deenergized, the pressure in the system decreases relatively gradually over time. If the motor is reenergized prior to the time the pressure drops to a level within the starting torque capabilities of the motor, the motor will stall. In the stalled condition, heat rapidly builds up within the motor to a point capable of damaging the motor or even causing a fire. A delay-on-break device can prevent this from occurring by insuring that the motor remains off for a period of time sufficient to allow the pressure to drop to a point at which the motor is capable of starting reliably. In other applications, in which low starting torque may not be a problem, delay-on-break devices can be used to protect motors, solenoids or other inductive loads subject to high inrush currents from excessive heating in the event they are repetitively energized and deenergized at too rapid a rate.

For A.C. applications, triacs are often preferred for use as the switching device in delay-on-break timers. Using the triac gate as a control input, a small current applied to the gate can be used to selectively enable the flow of a much larger current through the load. Triacs are also capable of conducting currents of substantial magnitude over both the positive and negative half cycles of the A.C. waveform with only slight voltage drop. Triacs suffer from a limitation however in that they normally cease conducting when zero crossings of the A.C. waveform are encountered unless the gate is retriggered.

To overcome this inherent limitation of triac operation in A.C. circuits, it has long been known to those of ordinary skill in the art to connect a latching capacitor of sufficient capacitance between the gate of the triac and one of the conductors of the A.C. line and to connect the load between that conductor and the first main terminal of the triac. Conduction of the triac through zero crossings of the A.C. waveform is maintained, i.e., the triac is "latched" by the capacitor as the capacitor discharges at least partially to supply a gate current sufficient to retrigger conduction of the triac notwithstanding the zero crossings of the voltage waveform on the A.C. line. This latching capacitor technique has long been taught in standard manuals describing how to use triacs and other thyristor devices such as at page 199 of the SCR Manual Including Triacs and Other Thyristors, Sixth Edition, copyrighted 1979 by the General Electric Company.

U.S. Pat. No. 4,991,049 to Kadah shows the use of a latching capacitor in a protective time delay circuit for delaying energization of an electric load until a predetermined time has elapsed from a prior deenergization. Kadah '049 shows a PNP transistor whose emitter is coupled to one side of the A.C. line through a rectifier in series with a resistor. Where it is desired to protect the load from possible damage due to low voltage (i.e., "brownout") conditions, a zener diode can be added in series with the emitter. The base of the transistor is coupled to the other side of the A.C. line by way of an RC timing network in the form of a resistor in parallel with a timing capacitor. The collector of the transistor is connected to the gate of a triac whose main terminals are in series with a load such as the coil of a compressor motor relay. A latching capacitor is connected between the gate of the triac and the side of the A.C. line common to one side of both the R.C. network and the load.

When the A.C. line is first energized, the timing capacitor is initially discharged and the transistor is biased into conduction allowing sufficient gate current to flow to turn on the triac and energize the load. The load remains energized through A.C. zero crossings due to the action of the latching capacitor. When the timing capacitor charges sufficiently, the transistor is biased off except that some current from the triac gate can flow through the collector-base junction, when it is forward biased, in order to maintain the charge on the timing capacitor while the A.C. line remains energized. Upon deenergization of the A.C. line, the triac ceases conducting and cannot be turned on again even if the A.C. line is reenergized until the timing capacitor discharges sufficiently to permit the transistor to be biased into conduction. Thus the transistor serves two roles. It controls gating of the triac according to the bias established by the timing capacitor and it also maintains the charge on the timing capacitor at all times while the load is energized.

One limitation of prior art protective devices of the above type is that their timing performance requires close attention to variations in tolerances among various discrete devices including significantly, transistor parameters. They also require the use of a capacitor for latching and to provide a brownout protection, a separate non-capacitive element, such as a zener diode connected in series with the emitter of the transistor. While such an arrangement can prevent the load from being switched from a de-energized state to an energized state if the line voltage is too low, it is of limited protective value in that it will not cause the load to be rapidly de-energized if a brownout occurs when the load is already energized.

SUMMARY OF THE INVENTION

The present invention overcomes the foregoing limitations of the prior art by providing an improved circuit connectable to a line and a load for preventing the load from being energized by the line until at least a predetermined time period has elapsed since the most recent deenergization of the load. In accordance with the invention, a pair of comparators are used to provide predictable and consistent control of a load switching device without regard to parameter variations normally associated with discrete transistors. The invention can therefore readily be implemented using a monolithic dual operational amplifier integrated circuit not subject to the substantial parameter tolerance ranges normally associated with discrete transistors and exhibiting very high input impedance and excellent immunity to thermal drift. According to a further aspect of the present invention, useful particularly in A.C. applications using a triac or other semiconductor load switching device, the latching capacitor is eliminated. Instead, conduction through zero crossings is maintained through cooperation of one of the comparators with a non-capacitive feedback element such as a resistor or zener diode. By selecting the feedback element as a zener diode in accordance with another important aspect of the invention, brownout protection capable of rapidly de-energizing the load upon occurrence of an undesired drop in line voltage is also afforded while simultaneously eliminating the need for a latching capacitor.

These and other aspects and advantages of the invention will become more apparent to the person of ordinary skill in the art upon review of the claims and the following detailed description read in conjunction with the appended drawings in which like reference numerals designate like items.

DETAILED DESCRIPTION

Figure 1:
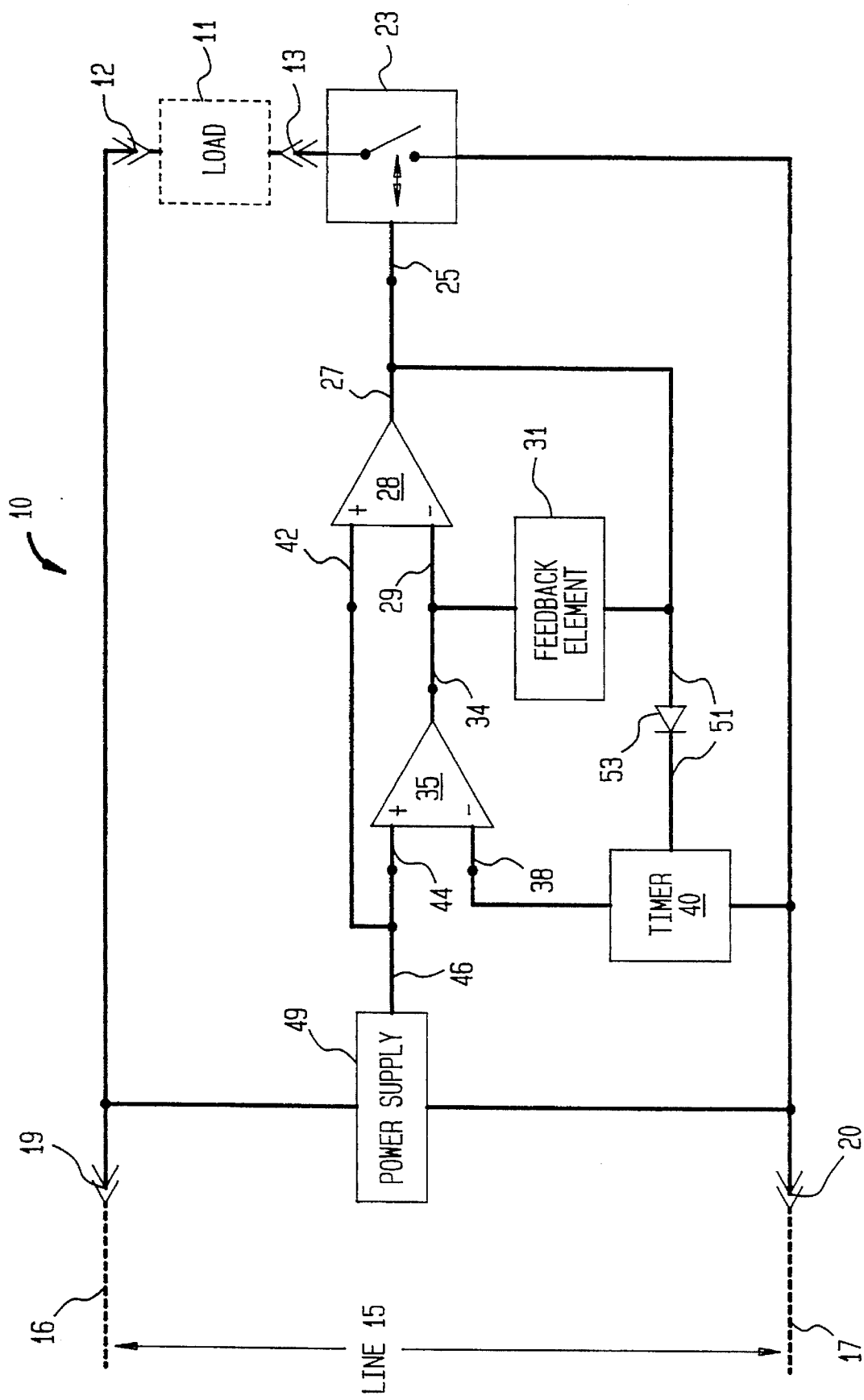
FIG. 1 is a simplified schematic diagram illustrating a preferred embodiment of a device according to the present invention which may be used for either A.C. or D.C. applications.

FIG. 1 shows a simplified schematic of a comparator controlled delay-on-break device 10 according to the present invention. Device 10 is connected to an electrical load 11 by way of connectors 12 and 13, as well as to a selectively energizable line 15 having conductors 16 and 17 connected to device 10 by way of respective connectors 19 and 20. Line 15 is usually connected to a power source through a switch, such as a thermostat switch (not shown). In the general form of device 10 illustrated in FIG. 1, line 15 may be either an A.C. or a D.C. line with the components of device 10 being selected accordingly. Device 10 includes a switching device 23 connectable in series with load 11 and across line 15 by way of the aforementioned connectors 12, 13, 19 and 20. In FIG. 1, switching device 23 is illustrated functionally as a switch having a control input 25 controllable to selectively enable line 15 to energize the load 11 by rendering switching device 23 electrically conductive. In practical applications, switching device 23 may comprise a wide variety of electro-mechanical or semiconductor devices including, but not limited to, electro-mechanical or solid state relays, transistors, silicon-controlled rectifiers (SCRs), triacs, or other thyristor devices. Control input 25 may take the form of a direct electrical connection or an input isolated optically, magnetically or otherwise from at least a portion of the remainder of the circuitry of device 10.

In accordance with the invention, control input 25 is connected to the output 27 of a first comparator 28 in order to achieve control over the conductive state of switching device 23 according to the state of the output 27 of comparator 28. Comparator 28 includes a feedback input 29 which, in accordance with an important aspect of the invention, is coupled to output 27 through a non-capacitive feedback element 31 which preferably takes the form of a resistor or a zener diode or a resistor and zener diode together in series. Feedback input 29 is also coupled to the output 34 of a second comparator 35 having a timer input 38 coupled to a timer 40. Comparators 28 and 35 each have respective reference inputs 42 and 44 coupled to a reference line 46 on which appears a reference voltage generated by a suitable power supply 49. Power supply 49 is in turn preferably coupled to line 15 from which it derives power. In accordance with a further aspect of the invention, timer 40 comprises an R.C. network charged by way of a charging path 51 coupled to the output 27 of comparator 28. In accordance with yet another aspect of the invention, charging path 51 includes a rectifier 53 polarized to prevent timer 40 from discharging through charging path 51.

When line 15 is initially energized, power supply 49 generates a suitable reference voltage on reference line 46 which appears at the reference inputs 42 and 44 of first comparator 28 and second comparator 35, respectively. Initially, the output of timer 40 applied to timer input 38 is at a voltage sufficiently lower than voltage applied to reference input 44 by way of reference line 46 that the output 34 of comparator 35 initially assumes a high value that is applied to the feedback input 29 of first comparator 28. The high value at feedback input 29 is then sufficiently higher in level than the reference voltage applied to reference input 42 as to cause the output 27 of first comparator 28 to assume an active state. Consequently, switching device 23 is rendered conductive, enabling line 15 to energize load 11. When the output 27 of first comparator 28 is active, it also energizes timer 40 through charging path 51 and rectifier 53.

When timer 40 is energized, its output undergoes a transition to a voltage sufficiently in excess of that appearing at reference input 44 as to cause the output 34 of second comparator 35 to drop low. The output 27 of the first comparator 28 does not follow however due to the latching action of non-capacitive feedback element 31 which permits load 11 to remain energized as long as line 15 remains energized. In the event line 15 is deenergized, load 11 is deenergized and first comparator 28 unlatches. Timer 40 operates to maintain timer input 38 in a sufficiently high voltage state relative to reference input 44 as to prevent output 34 from triggering first comparator 28 and switching device 23 in order to enable energization of load 11 until at least a predetermined period of time has elapsed since the most recent deenergization of load 11. Once the predetermined period of time elapses, timer 40 allows timer input 38 to reassume a state in which output 34 will enable load 11 to be energized upon reenergization of line 15.

Figure 2:
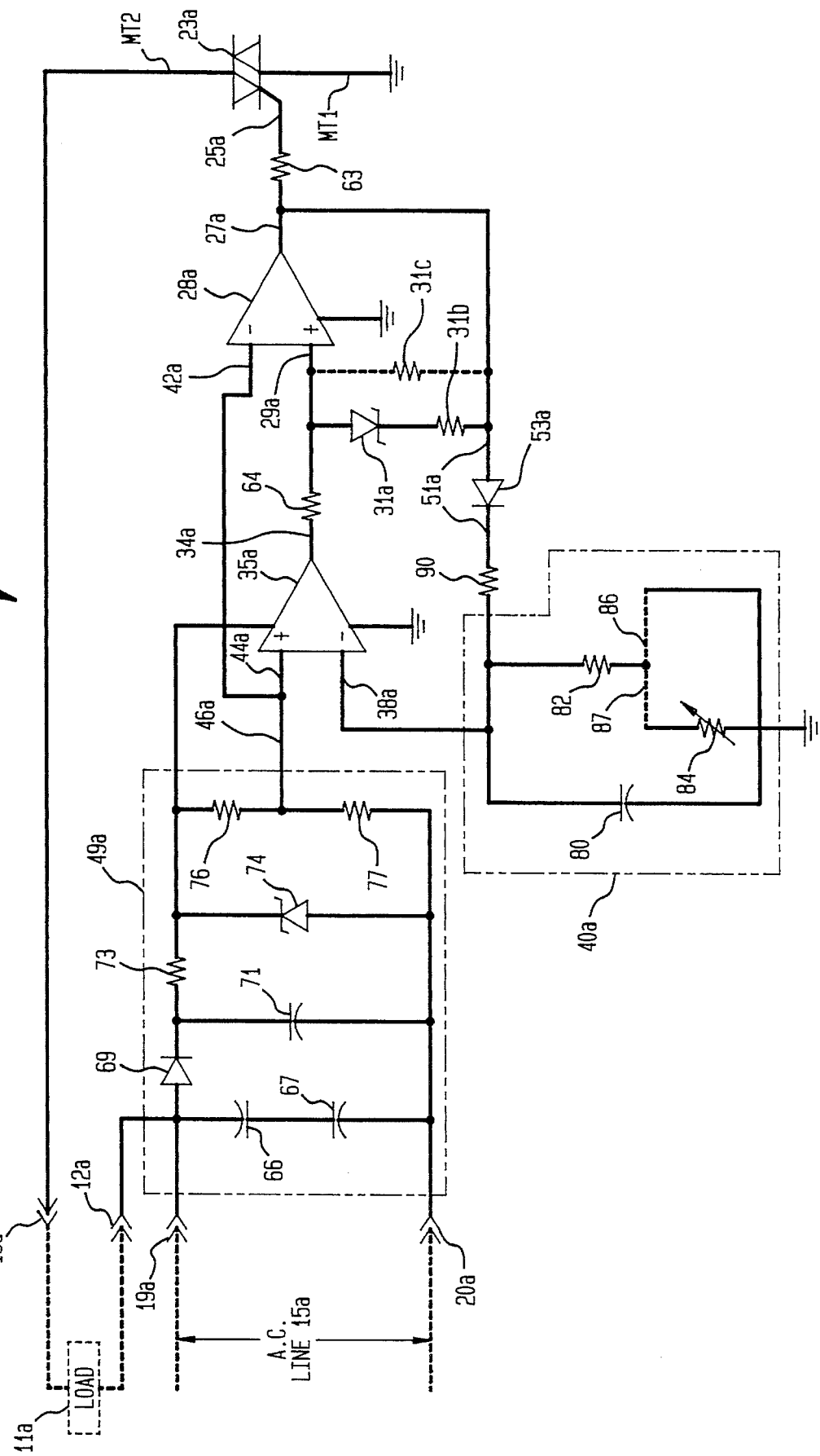
FIG. 2 is a schematic diagram illustrating a preferred embodiment of the invention adapted particularly for A.C. applications.

FIG. 2 shows a preferred embodiment, 10a of the invention useful for A.C. applications which uses a triac 23a whose control input is a gate 25a coupled to the output 27a of a first comparator 28a by way of a resistor 63. Triac 23a is coupled in series with an A.C. load 11a and across an A.C. line 15a by way of connectors 12a, 13a, 19a and 20a as illustrated. Comparator 28a includes a feedback input 29a which is coupled to output 27a through a non-capacitive feedback element which may suitably comprise a resistor but which preferably takes the form of a zener diode 31a and optionally, a resistor 31b in series therewith. Alternatively, a resistor 31c could be used in lieu of either zener diode 31a alone or zener diode 31a and optional series resistor 31b. Feedback input 29a is also coupled, through a resistor 64, to the output 34a of a second comparator 35a. Comparators 35a and 28a are each preferably implemented using a single, monolithic dual operational amplifier integrated circuit such as a type LM2904 available from National Semiconductor, or equivalent. Comparators 28a and 35a each have respective reference inputs 42a and 44a which are coupled to a reference line 46a on which a D.C. reference voltage is established by a power supply 49a which derives its power from the A.C. line 15a by way of connectors 19a and 20a.

In the embodiment of FIG. 2, power supply 49a includes a pair of transient suppression capacitors 66 and 67 connected in series with one another and in parallel across A.C. line input connectors 19a and 20a as shown. A diode 69 serves as a half wave rectifier whose output is filtered by capacitor 71. A resistor 73 is provided in series with diode 69 to serve as a current limiter. Further voltage regulation is provided by a zener diode 74. The output of a voltage divider consisting of resistors 76 and 77 connected in series with one another and in parallel across zener diode 74 serves as reference line 46a to provide a D.C. reference voltage thereon. Other outputs (not shown) from power supply 49 provide power to comparators 28a and 35a.

A timer 40a includes a timing capacitor 80 in parallel with at least one fixed resistor 82 and/or a variable resistor 84 to provide either a fixed or variable predetermined time delay period as may optionally be selected by the installation of a jumper wire in either location 86 or location 87 as indicated in FIG. 2. Timer 40a is coupled to a timer input 38a of comparator 35a. A charging path 51a couples timer 40a to the output 27a of comparator 28. A rectifier 53a in charging path 51a prevents timer 40a from discharging through charging path 51a. In the preferred embodiment of FIG. 2, a resistor 90 is also provided in charging path 51a to serve as a current limiter. For preventing spurious triggering of triac 23a in applications where radio frequency (RF) noise of substantial energy may be present an RF bypass capacitor (not shown) may optionally be connected across the main terminals of triac 23a and a second RF bypass capacitor (also not shown) connected between the output 27a of comparator 28a and the side of the A.C. line 15a indicated in FIG. 2 as connected to the first main terminal of triac 23a. Table 1 below sets forth a parts listing for a circuit according to FIG. 2 intended for use in conjunction with a 24 volt A.C. load. Operation of the preferred embodiment of FIG. 2 can be more fully understood with reference to the simplified timing diagram of FIG. 3.

TABLE 1

| | |
|---|---|
| Comparators 28a and 35a | National Semiconductor LM2904 dual operational amplifier |
| Triac 23a | Teccor L6004F31, 4 Amp, 600 Volts |
| Resistor 63 | 1 Kilohm, 5%, 0.25 Watt |
| Diode 53a | Motorola GP10M, 1 Amp, 1000 Volt, low leakage |
| Zener Diode 31a | Motorola 1N5229B, 4.3 Volt, 0.5 Watt |
| Resistor 64 | 4.7 Kilohm, 5%, 0.25 Watt |
| Resistor 90 | 620 Ohm, 5%, 0.25 Watt |
| Potentiometer 84 | 3 Megohm, 10% |
| Resistor 82 | 300 Kilohm, 5%, 0.25 Watt |
| Capacitor 80 | 47 UF, 10%, 50 Volt |
| Resistor 76 | 160 Kilohm, 5%, 0.25 Watt |
| Resistor 77 | 20 Kilohm, 5%, 0.25 Watt |
| Zener Diode 74 | Motorola 1N5240B, 10 Volt, 0.5 Watt |
| Resistor 73 | 820 Ohm, 5%, 1 Watt |
| Capacitor 71 | 10 UF, 10%, 50 Volt |
| Diode 69 | Motorola 1N4007, 1 Amp, 1000 Volt |
| Capacitors 66, 67 | 22 UF, 10%, 50 Volt |

Figure 3:
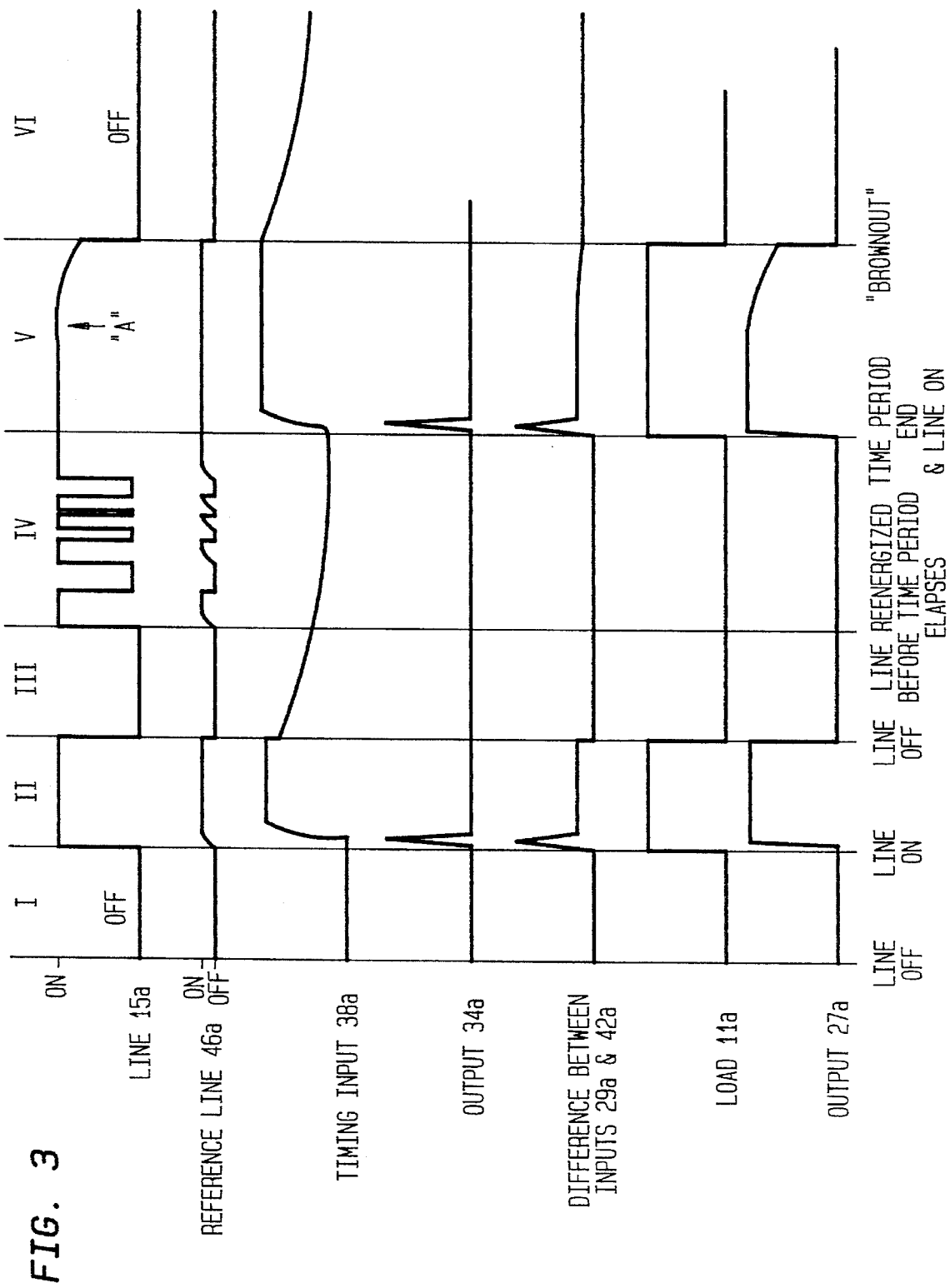
FIG. 3 is a simplified timing diagram illustrating the operation of the device of FIG. 2.

In operation, FIG. 3 shows an initial interval I in which the A.C. line 15a and the load 11a have been deenergized for a length of time considerably longer than the predetermined time delay interval defined by timer 40a. During such intervals, all illustrated circuit locations within device 10a are correspondingly deenergized. At the beginning of interval II, line 15a is energized and a reference voltage appears on reference line 46a which is applied to reference inputs 42a and 44a of comparators 28a and 35a, respectively. Owing to the initial discharged state of timing capacitor 80 during interval I, the voltage at the reference input 44a of comparator 35a briefly exceeds the voltage at its timing input 38a causing the output 34a of comparator 35a to momentarily assume a high state. When this momentary high state appears at the feedback input 29a of comparator 28a, the voltage there exceeds the reference voltage at its reference input 42a and the output 27a of comparator 28a assumes a high state thus triggering the gate 25a of triac 23a and energizing load 11a.

An important aspect of the invention relates to the manner in which comparator 28a and a feedback element, such as zener diode 31a cooperate to provide for the continued energization of load 11a as long as line 15a remains energized.

When the output 27a of comparator 28a goes high, the timing capacitor 80 of timer 40a charges rapidly through rectifier 53a and resistor 90. As a consequence, the voltage at timer input 38a rises above the reference voltage at the reference input 44a of comparator 35a causing its output to drop low. However, as long as line 15a remains energized to a sufficient level, the output 27a of comparator 28a does not drop low. The output 27a of comparator 28a remains high due to the action of a non-capacative feedback element such as zener diode 31a. When the output 34a of comparator 35a drops low, zener diode 31a or another suitable feedback element such as a resistor applies a sufficient portion of the voltage appearing at output 27a to feedback input 29a, to permit output 27a to remain in a high state and to remain so unless the line voltage undergoes a predetermined decrease in voltage defining a "brownout" condition. Unless such a "brownout" condition occurs, interval II continues indefinitely as long as line 15a remains energized to a sufficient level thus permitting the gate 25a of triac to be continuously retriggered notwithstanding zero crossings of A.C. line 15a and enabling load 11a to remain energized.

Intervals III and IV illustrate the operation of device 10a when line 15a is deenergized and subsequently re-energized once or repeatedly in less than a predetermined time period after deenergization of load 11a. Upon deenergization of line 15a at the beginning of interval III, all external power is removed from device 11 and the only significant electrical energy remaining therein is that previously stored by timing capacitor 80. As reflected by the waveform appearing at timing input 38a, timing capacitor 80 discharges through resistor 82 or resistor 82 and variable resistor 84 at a rate which determines the length of the desired predetermined delay period. Discharge of capacitor 80 through charging path 51a is blocked by diode 53a and discharge through timing input 38a avoided due to the high input impedance of comparator 35a. Thus, when line 15a is deenergized, timer 40a operates to maintain a voltage difference between the timer input 38a and the reference input 44a of comparator 35a of a polarity and magnitude sufficient to prevent the output 34a of comparator 35a from acting through comparator 28a and triac 23a to enable energization of load 11a until at least a predetermined time period has elapsed thereafter.

If line 15a is re-energized, as at the beginning of interval IV, before timing input 38a drops below the voltage applied to reference input 44a, the output 34a of comparator 35a will remain low thus preventing the output 27a of comparator 28 from being activated and maintaining load 11a deenergized. Since output 27a remains low, capacitor 28 is not recharged and the time delay will continue as measured from the most recent deenergization of the load irrespective of any intervening energizations of line 11a before the predetermined time interval elapses.

Once timing capacitor 80 discharges so that the voltage at the reference input 44a of comparator 35a is sufficiently in excess of that at its timing input 38a, energization of line 15a, as at the beginning of interval V, will enable energization of load 11a as during interval II and load 11a will remain energized as long as line 15a remains energized to a sufficient level.

As shown in FIG. 3 at point A in interval V, the magnitude of the voltage on line 15 may decrease slightly without load 11a being deenergized. The difference in voltage between the inputs 42a and 29a of comparator 28 merely decreases in response. If, however, the drop in the voltage of A.C. line 15a is sufficiently large that load 11a should not be operated, the voltage difference between inputs 29a and 42a drops to a level incapable of maintaining the output of comparator 28a in a high state. As a consequence, upon the occurrence of such a "brownout" condition, the output of comparator 27a drops low and load 11a is deenergized substantially immediately upon occurrence of the next zero crossing of A.C. line 15a. Thereafter, load 11a remains deenergized, notwithstanding any prior re-energizations of line 15a, until at least the predetermined time period determined by timer 40a elapses.

While the foregoing constitute preferred embodiments of the present invention, it is to be understood that the invention is not limited thereby and that in light of the present disclosure various alternative embodiments will be apparent to persons skilled in the art. Accordingly, it is to be recognized that changes can be made without departing from the scope of the invention as particularly pointed out and distinctly claimed in the appended claims including all legal equivalents.

What is claimed is:

1. A circuit connectable to a line and an electrical load for preventing the load from being energized by the line until at least a predetermined time period has elapsed since the most recent deenergization of the load, said circuit comprising:

(a) a switching device connectable across the line in series with the load, said switching device having a control input controllable to enable the line to energize the load;

(b) a first comparator having a first output coupled to said control input for controlling said control input and further having a first reference input and a feedback input;

(c) a second comparator having a second output coupled to said feedback input and further having a timer input and a second reference input;

(d) a power supply coupled to the line and having a reference voltage line coupled to said first and second reference inputs;

(e) timer means coupled to said first output and to said timer input for maintaining a condition between said timer input and said second reference input appropriate to prevent said second output from causing said control input to enable energization of the load until at least said predetermined period of time has elapsed since the load was most recently deenergized.

2. The circuit of claim 1 wherein the line is an A.C. line and said switching device comprises a semiconductor device.

3. The circuit of claim 2 wherein said semiconductor device comprises a triac.

4. The circuit of claim 2 further comprising a feedback element coupled between said first output and said feedback input to permit energization of said load to be maintained notwithstanding zero crossings of the A.C. line.

5. The circuit of claim 4 wherein said feedback element comprises a resistor.

6. The circuit of claim 4 wherein said feedback element comprises a zener diode.

7. The circuit of claim 1 wherein said timer means comprises an R-C network coupled to said first output by way of a charging path through which said R-C network is charged when the load is energized.

8. The circuit of claim 7 further comprising a rectifier in said charging path, said rectifier being polarized to prevent discharging of said R-C network through said charging path.

9. The circuit of claim 1 wherein the line is either a D.C. line or an A.C. line.

* * * * *